UNITED STATES PATENT OFFICE.

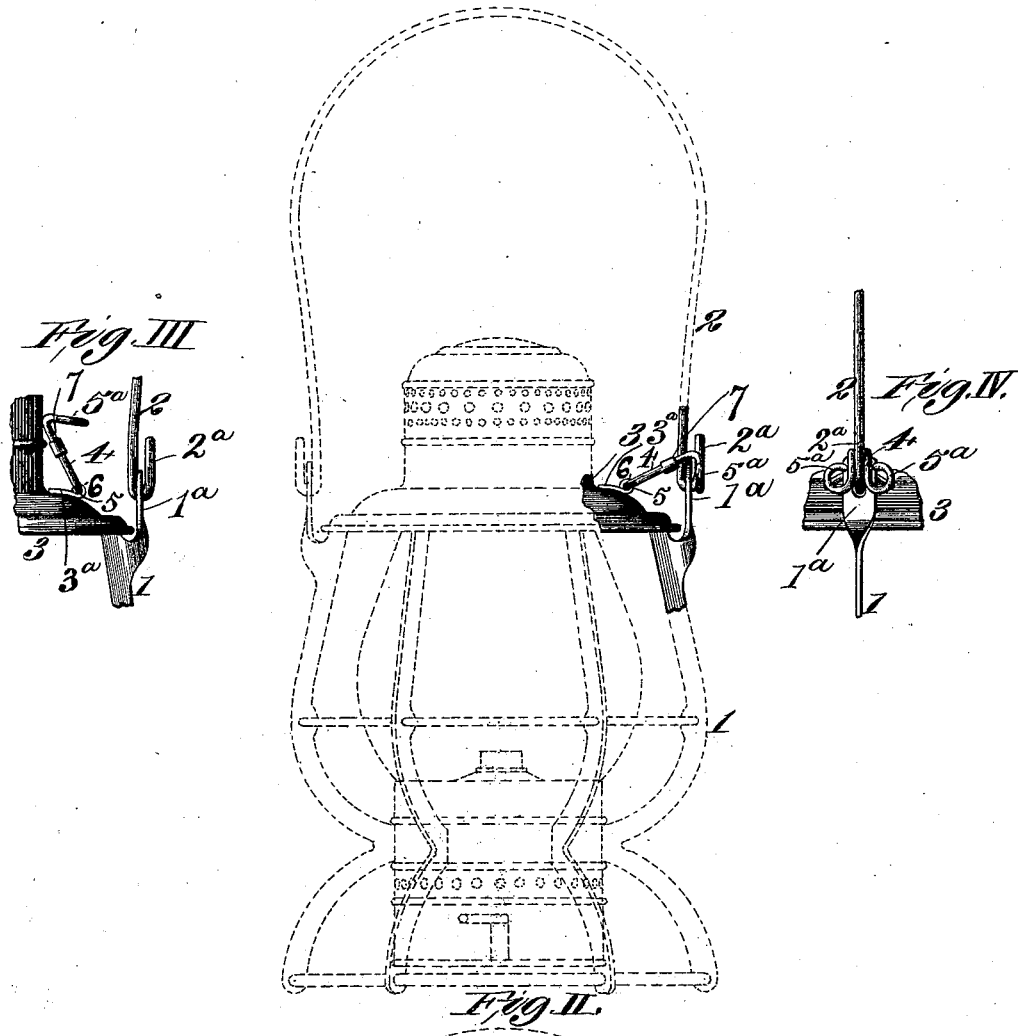

HENRY H. SEIM, OF ST. LOUIS, MISSOURI, ASSIGNOR TO THE M. M. BUCK MANUFACTURING COMPANY, OF SAME PLACE.

BAIL-HOLDER FOR LANTERNS.

SPECIFICATION forming part of Letters Patent No. 554,543, dated February 11, 1896.

Application filed September 19, 1895. Serial No. 562,962. (No model.)

*To all whom it may concern:*

Be it known that I, HENRY H. SEIM, a citizen of the United States, and a resident of the city of St. Louis, in the State of Missouri, have invented a certain new and useful Improvement in Bail-Holders for Lanterns, of which the following is a full, clear, and exact description, reference being had to the accompanying drawings, forming a part of this specification.

My invention relates to a device for holding the ordinary bail of a lantern in an elevated position, the invention being particularly adapted for use in connection with railway-lanterns; and my invention consists in features of novelty hereinafter fully described, and pointed out in the claims.

Figure I illustrates a side elevation of a lantern in outline and the device applied thereto. Fig. II illustrates a top view of the lantern and device as shown in Fig. I. Fig. III is a detail side view of the device in its inoperative position. Fig. IV is a detail front view of the device in operative position.

Referring to the drawings, 1 designates a lantern, which may be of any ordinary construction, and secured to the lantern by the usual ears 1ª is an ordinary bail 2, having looped ends 2ª.

3 designates the top of the lantern, to which is hinged by a strap 3ª a swinging clamp or catch. This catch 5 is arranged directly at the side of the bail, and it is so formed as to straddle a looped end of the bail 2 at its connection with the lantern, and when in such position it rests on and is supported by the adjacent ear and holds the bail in an elevated position, as will be clearly understood by reference to the drawings. The catch, as shown, consists of a single wire hinged to the lantern-top by a sleeve 6 on the strap 3ª and bent to form two arms 4, that straddle the bail, and having outturned ends 5ª, by which the catch can be readily operated. The catch is held from spreading and the inner side of the looped end braced to the ear by a keeper 7. I do not, however, wish to be limited to any particular form of catch. When the bail is thus held, the lantern may be readily swung by the bail without loose movement between the lantern and the bail, while if it is desired to turn the bail down against the body of the lantern or to use the lantern with the bail loose the catch can be readily turned up into the position shown in Fig. III out of engagement with the bail.

I claim as my invention—

1. An attachment for lanterns, consisting of a catch connected to the top of the lantern, and arranged to be thrown down into and out of engagement with the looped end of the bail of the lantern, substantially as and for the purpose set forth.

2. An attachment for lanterns, consisting of a catch hinged to the top of the lantern, and arranged to be moved into and out of engagement with the looped end of the bail of the lantern, substantially as and for the purpose set forth.

3. An attachment for lanterns, consisting of a catch hinged to the top of the lantern and having two arms, and outwardly-turned ends, and arranged to be moved into engagement with the bail of the lantern, for the purpose of holding said bail from movement relatively to the lantern, substantially as and for the purpose set forth.

4. A lantern attachment comprising a catch hinged to the top of the lantern, adapted to embrace a looped end of the bail and to rest on and to be supported at its outer end by the adjacent ear; substantially as described.

HENRY H. SEIM.

In presence of—
 E. S. KNIGHT,
 W. FINLEY.